(12) United States Patent
Park et al.

(10) Patent No.: US 9,864,756 B2
(45) Date of Patent: *Jan. 9, 2018

(54) METHOD, APPARATUS FOR PROVIDING A NOTIFICATION ON A FACE RECOGNITION ENVIRONMENT, AND COMPUTER-READABLE RECORDING MEDIUM FOR EXECUTING THE METHOD

(71) Applicant: Intel Corporation, Santa Clara, CA (US)

(72) Inventors: Minje Park, Seongnam (KR); Tae-Hoon Kim, Seoul (KR)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/939,093

(22) Filed: Nov. 12, 2015

(65) Prior Publication Data

US 2016/0063033 A1 Mar. 3, 2016

Related U.S. Application Data

(63) Continuation of application No. 14/344,983, filed as application No. PCT/KR2013/001556 on Feb. 27, 2013, now Pat. No. 9,213,886.

(30) Foreign Application Priority Data

Feb. 28, 2012 (KR) .................. 10-2012-0020523

(51) Int. Cl.
*G06F 17/30* (2006.01)
*G06K 9/03* (2006.01)
(Continued)

(52) U.S. Cl.
CPC ... *G06F 17/30247* (2013.01); *G06K 9/00221* (2013.01); *G06K 9/00241* (2013.01);
(Continued)

(58) Field of Classification Search
CPC .................................................. G06F 17/30247
See application file for complete search history.

(56) References Cited

U.S. PATENT DOCUMENTS

2003/0185424 A1 10/2003 Sato et al.
2006/0204050 A1 9/2006 Takizawa
(Continued)

FOREIGN PATENT DOCUMENTS

CN 101587543 11/2009
CN 101661557 3/2010
(Continued)

OTHER PUBLICATIONS

PCT Search Report, PCT/KR2013/001556, 1 page, Jun. 10, 2013.
(Continued)

*Primary Examiner* — David F Dunphy
(74) *Attorney, Agent, or Firm* — Blakely, Sokoloff, Taylor & Zafman LLP

(57) ABSTRACT

According to a method for providing a notification on a face recognition environment of the present disclosure, the method includes obtaining an input image that is input in a preview state, comparing feature information for a face included in the input image with feature information for a plurality of reference images of people stored in a predetermined database to determine, in real-time, whether the input image satisfies a predetermined effective condition for photographing. The predetermined effective condition for photographing is information regarding a condition necessary for recognizing the face included in the input image at a higher accuracy level than a predetermined accuracy level. The method further includes providing a user with a predetermined feedback for photographing guidance that corre-
(Continued)

sponds to whether the predetermined effective condition for photographing is satisfied. According to the method, a condition of a face image detected for face recognition is checked, and if there is an unsuitable element in recognizing the face, it is notified to a user such that an obstruction environment hindering the face recognition by the user is removed, for enhancing a success rate of the face recognition.

20 Claims, 3 Drawing Sheets

(51) Int. Cl.
*H04N 5/232* (2006.01)
*G06K 9/00* (2006.01)

(52) U.S. Cl.
CPC ..... *G06K 9/00248* (2013.01); *G06K 9/00281* (2013.01); *G06K 9/00912* (2013.01); *G06K 9/03* (2013.01); *G06K 9/033* (2013.01); *G06K 9/036* (2013.01); *H04N 5/23219* (2013.01); *H04N 5/23222* (2013.01)

(56) References Cited

U.S. PATENT DOCUMENTS

| | | |
|---|---|---|
| 2008/0075378 A1 | 3/2008 | Kim et al. |
| 2008/0297617 A1* | 12/2008 | Jeong ............... H04N 5/23293 348/222.1 |
| 2009/0100050 A1 | 4/2009 | Erol et al. |
| 2009/0251560 A1 | 10/2009 | Azar et al. |
| 2009/0263022 A1* | 10/2009 | Petrescu ............ G06K 9/00234 382/195 |
| 2011/0129149 A1 | 6/2011 | Kang |
| 2011/0150451 A1 | 6/2011 | Kubota |
| 2012/0062556 A1* | 3/2012 | Yamamoto ......... H04N 13/0022 345/419 |

FOREIGN PATENT DOCUMENTS

| | | |
|---|---|---|
| CN | 102150180 | 8/2011 |
| JP | 2004-118627 | 4/2004 |
| JP | 2007-094637 | 4/2007 |
| JP | 2007-148968 | 6/2007 |
| JP | 2010-003010 | 1/2010 |
| KR | 10-2007-0077973 | 7/2007 |
| KR | 10-2008-0090035 | 10/2008 |

OTHER PUBLICATIONS

Office Action from Counterpart CN Patent Application No. CN201380011172.2, dated Sep. 22, 2016, 10 pages.

EP Search Report Supplementary, EP13754712, dated Dec. 7, 2015, 11 pages.

* cited by examiner

METHOD, APPARATUS FOR PROVIDING A NOTIFICATION ON A FACE RECOGNITION ENVIRONMENT, AND COMPUTER-READABLE RECORDING MEDIUM FOR EXECUTING THE METHOD

The present patent application is a continuation application of Ser. No. 14/344,983, filed Mar. 14, 2014, pending, which is a U.S. National Phase Application under 35 U.S.C. 371 of International Application No. PCT/KR2013/001556 filed Feb. 27, 2013, which claims priority from Korean Application No. 10-2012-0020523, filed Feb. 28, 2012, the contents of which are incorporated herein in their entirety by reference.

TECHNICAL FIELD

The present disclosure relates to a method and apparatus for providing a notification on a face recognition environment, and a computer-readable recording medium for performing the method, where a condition of a face image detected for face recognition is checked, and if there is an unsuitable element in recognizing the face, a user is notified in advance such that the position of the user is adjusted, or an obstruction environment hindering the face recognition is improved or removed to enhance a success rate of the face recognition, and a reason for the unsuitable face recognition is notified to a user, thereby allowing the user to recognize the reason.

BACKGROUND

Biometric technology is a technology for recognizing a plurality of physical features such as a fingerprint, a face, an iris, a vein, etc., which are distinct for each individual person. Such physical features may be also utilized in the field of security, or the like because such physical features cannot be stolen or replicated unlike a key or password, and there are no risks with changes or losses.

From among the biometric technology, face recognition technology is for detecting a region of a face in a video or photograph image and identifying the face included in the detected face region. Thus, the technology may be utilized in various applications as well as in the field of security to keep up with the fast-paced smartphone industry.

In general, face recognition technology is implemented to detect a region of a face in a video or photograph image and compare the detected face image with a plurality of face images pre-stored in a storage unit, such as a database, to determine a match.

However, as a prerequisite to improving the accuracy of the face recognition technology implemented as above, face image obtained from a video or photograph is required to be inputted clearly enough to be able to compare with a plurality of face images pre-stored in a database. However, the input face image cannot maintain an appropriate threshold level for face recognition at all times.

Accordingly, if there is an input of a face image at a level that is incapable of normal face recognition due to a variety of factors such as a user's position change, posture instability, surrounding environment, and the like, providing a notification on which portion of the face image has an element unsuitable for face recognition is required.

To achieve this, in Korean Patent Application Publication No. 10-1999-0037927 published on May 25, 1999, entitled "Method for processing a transaction in a bank transaction processing machine for image recognition having a normal transaction inducing function," a transaction processing method of a bank transaction processing device is disclosed for image recognition having a normal transaction inducing function. If face recognition is not successful through the transaction processing method in the bank transaction processing device equipped with face recognition system, a position of a user, a shape of a face and a failure cause are notified to a user and the position of the user is adjusted and an obstruction environment hindering the face recognition is removed, thereby inducing a normal transaction.

However, such conventional technology makes providing a notification on an element unsuitable for face recognition after the face recognition is performed and has failed. Therefore, there are problems with an error, as described above, not being preventable by a user's response or action when a face image is inputted.

Therefore, according to such conventional technology, it takes a considerably long time to correct the error on the face image and complete the face recognition.

DETAILED DESCRIPTION

Technical Problem

Therefore, an object of the present disclosure is to solve all the aforementioned problems in the prior art.

Another object of the present disclosure is to, in case that it is determined that there is an unsuitable element for face recognition by checking in advance the state of a region of a face detected in an image for the face recognition, notify a user of the unsuitable element and allow the user to improve or remove an obstruction environment hindering the face recognition for improving a success rate of the face recognition.

In addition, another object of the present disclosure is to notify a user of a specific obstruction reason in real-time such that the user is able to recognize the reason if such obstruction environment is recognized.

Technical Solution

The representative configuration of the present disclosure for achieving the above objects is described below.

According to an aspect of the present disclosure, there is provided a method for providing a notification on a face recognition environment, comprising: (a) obtaining an input image that is input in a preview state; (b) comparing feature information for a face included in the input image with feature information for a plurality of reference images of people stored in a predetermined database to determine, in real-time, whether the input image satisfies a predetermined effective condition for photographing, the predetermined effective condition for photographing being information regarding a condition necessary for recognizing the face included in the input image at a higher accuracy than a predetermined accuracy; and (c) providing a user with a predetermined feedback for photographing guidance that corresponds to whether the predetermined effective condition for photographing is satisfied.

According another aspect of the present disclosure, there is provided a device for providing a notification on a face recognition environment, comprising: an image input unit for obtaining an input image that is input in a preview state; a condition determination unit for comparing feature information for a face included in the input image with feature information for a plurality of reference images of people stored in a predetermined database to determine, in real-time, whether the input image satisfies a predetermined effective condition for photographing, the predetermined effective condition for photographing being information regarding a condition necessary for recognizing the face included in the input image at a higher accuracy than a predetermined accuracy; and a feedback providing unit for providing a user with a predetermined feedback for photographing guidance that corresponds to whether the predetermined effective condition for photographing is satisfied.

In addition, there is provided a computer-readable recording medium for recording a computer program to perform other methods, and apparatus, and the above method for implementing the present disclosure.

Advantageous Effects

According to the present disclosure, the state of a facial image detected for face recognition is checked in advance, and if it is determined that there is an element unsuitable for face recognition, it is notified to a user in real-time, thereby allowing the user to improve or remove an obstruction environment hindering the face recognition for improving a success rate of the face recognition.

Further, according to the present disclosure, if such obstruction environment is recognized, a specific obstruction reason is notified to a user such that the user is able to recognize the reason. Accordingly, reliability of a face recognition system is further improved, and a user's inconvenience is resolved by allowing the user to recognize deficiencies in performing the face recognition, and ultimately, functions of the face recognition system are made more completely such that the use of the system can be widespread.

Furthermore, according to conventional techniques, a terminal with poor face recognition was to be blamed only. However, according to the present disclosure, a user may recognize that poor face recognition may be due to the fact that the user himself/herself is physically in an obstruction environment where face recognition may not work properly, rather than the problem being due to a terminal, and thus, a user's dissatisfaction can be reasonably resolved.

EMBODIMENTS

Figure 1:
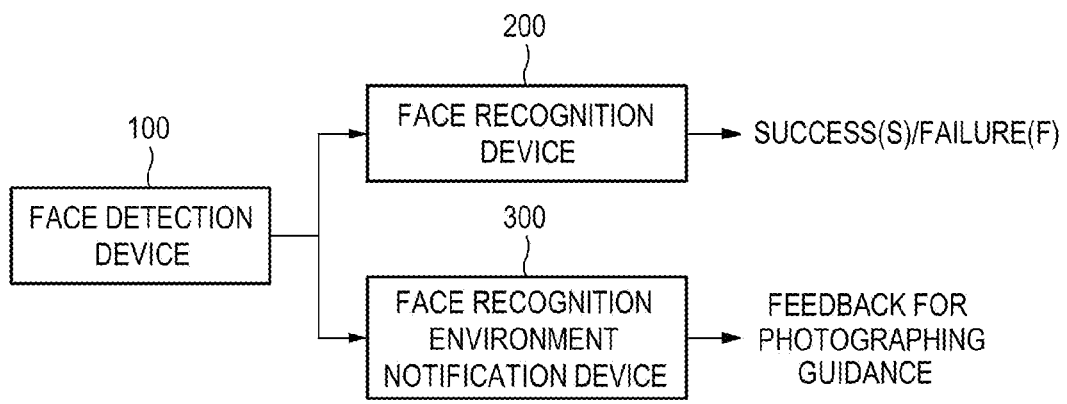
FIG. 1 is a block diagram illustrating a schematic configuration of a face recognition system according to an embodiment of the present disclosure.

In the following detailed description of the present disclosure, references are made to the accompanying drawings that show, by way of illustration, specific embodiments in which the present disclosure may be implemented. These embodiments are described in sufficient detail to enable those skilled in the art to implement the present disclosure. It should be understood that various embodiments of the present disclosure, although they are different, are not necessarily mutually exclusive. For example, specific features, structures, and characteristics described herein, in connection with one embodiment, may be implemented within other embodiments without departing from the spirit and scope of the present disclosure. In addition, it should be understood that the locations or arrangement of individual elements within each disclosed embodiment may be modified without departing from the spirit and scope of the present disclosure. The following detailed description is, therefore, not to be taken in a limiting sense, and the scope of the present disclosure is defined only by the appended claims as well as the full range equivalent to what the claims claim, if appropriately interpreted. In the drawings, similar reference numbers refer to the same or similar function through many ways.

Hereinafter, various embodiments of the present disclosure will be described in detail with reference to the accompanying drawings in order that those skilled in the art can easily practice the present disclosure.

Preferred Embodiment of the Present Disclosure

Overall System Configuration

FIG. 1 is a block diagram illustrating a schematic configuration of a face recognition system according to an embodiment of the present disclosure.

Referring to FIG. 1, a face recognition system may include a face detection device 100, a face recognition device 200, and a face recognition environment notification device 300.

Here, the face recognition system is a digital device, and may be a portable digital device such as a personal computer (for example, a tablet computer, a laptop computer, etc.), a PDA, a web pad and a cellular phone. The digital device includes a memory means and is equipped with a microprocessor to have operation capabilities, which can be easily be employed as the face recognition system according to the present disclosure. However, the face detection device 100, face recognition device 200, and face recognition environment notification device 300 are not limited to be necessarily implemented as a single device, and various modification examples can be introduced.

First, the face detection device 100 performs a function for detecting a region of a face in a captured image using a Face Detection ("FD") technique if the face is included in the image captured by an image sensor (not shown). Various technologies, which have been published, may be used for the FD technique. For example, it may be performed using feature patterns that are learned and selected based on an Adaboost learning algorithm. For a method and apparatus of detecting a face in an image, the applicant(s) of the present disclosure previously filed Korean Patent Application No. 10-2011-0114160, entitled "FACE DETECTION METHOD, APPARATUS, AND COMPUTER-READABLE RECORDING MEDIUM FOR PERFORMING THE METHOD," which is herein incorporated by reference.

The face detection device 100 may also obtain information on a direction for the region of the face in the captured image using a Head Tracking ("HT") technique. Various technologies, which have been published, may be applied for the HT technique, and the direction information for the face region obtained using the HT technique may be used in determining a face direction condition on a face recognition environment notification device 300 described below.

The face detection device 100 as above may perform a function of detecting whether a face appears in an input image that is input in a preview state.

In addition, the face recognition device 200 according to an embodiment of the present invention compares information on a face image (i.e., feature information) detected by the face detection device 100 with information on each of a plurality of face images (i.e., feature information) stored in a database (not shown) to output a result for face recognition. That is, it is detected whether the face image detected by the face detection device 100 is identical (or similar) to at least one image of the pre-stored face images. If it is determined as having a similarity to a particular person that is greater than a predetermined similarity level, a signal indicative of a match, i.e., a signal indicating that the face image is recognized as the particular person may be output as the result for face recognition. On the other hand, if it is determined as not having a similarity that is greater than the predetermined similarity level even after comparing to each of the plurality of face images, a signal indicative of a mismatch may be output as the result for the face recognition. In addition, each of the plurality of face image stored in the database may have an identification symbol, and the face recognition device 200 may output the identification symbol of a matching face image from among the face images as the signal indicative of the match. For a method and apparatus of comparing a detected face image to a plurality of pre-stored face images to recognize a face, the applicant(s) of the present disclosure previously filed Korean Patent Application No. 10-2011-0105547, entitled "FACE RECOGNITION, APPARATUS, AND COMPUTER-READABLE RECODING MEDIUM FOR PERFORMING THE METHOD," which is herein incorporated by reference.

The face recognition environment notification device 300, according to an embodiment of the present disclosure, receives via the face detection device 100 an input of an image where a region of a face is detected and performs a function of notifying a user of the state of a face recognition environment. That is, the face image detected via the face detection device 100 is compared with at least one image of the plurality of pre-stored face images for determining, in real-time, whether the detected face image (i.e., the input image) satisfies a predetermined effective condition for photographing, which is information on a condition necessary for recognizing the face included in the detected face image at an accuracy level higher than or equal to a predetermined accuracy level. A user may be provided with a predetermined feedback for photographing guidance that corresponds to whether the predetermined effective condition for photographing is satisfied. If a user is notified of a signal indicating that it is unqualified for recognizing a region of a face from the face recognition environment notification device 300, the user may improve a condition that has been determined as being unqualified and perform the step of recognizing a face again. Thus, a possibility of success for the face recognition may be increased. The face recognition environment notification device 300 will be described in detail below with reference to FIG. 4.

Figure 2:
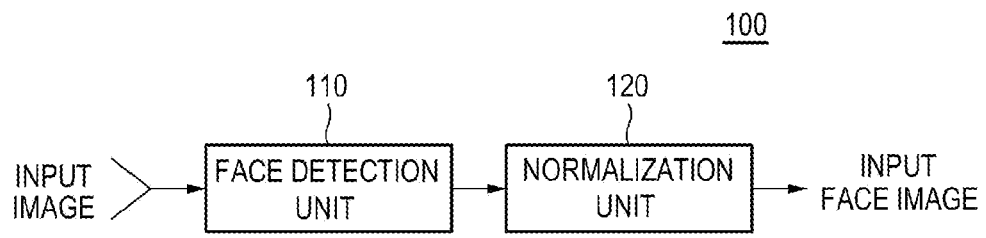
FIG. 2 is a block diagram illustrating a configuration of a face detection device according to an embodiment of the present disclosure.

FIG. 2 is a block diagram illustrating a configuration of a face detection device according to an embodiment of the present disclosure.

Referring to FIG. 2, the face detection device 100 may include a face detection unit 110 and a normalization unit 120.

The face detection unit 110 may detect a region of a face from an input image. The face detection unit 110 may detect eyes, and additionally detect eyebrows, a nose, a mouth, and the like for detecting the region of the face. The detections, as described above also allows for arranging the input face image in a direction that is identical to those of a plurality of pre-stored face images.

The normalization unit 120 may normalize a detected face image as a gray image of a predetermined size. As such, if an input image has a size and an arrangement that are different from those of the face images pre-stored in the database (not shown) and includes other images than a face image, the normalization unit 120 is for performing a detection operation for a face image having a size and an arrangement that are identical to those of the pre-stored face images. However, such normalization unit 120 may not be included in the face detection device 100 according to some embodiments.

Figure 3:
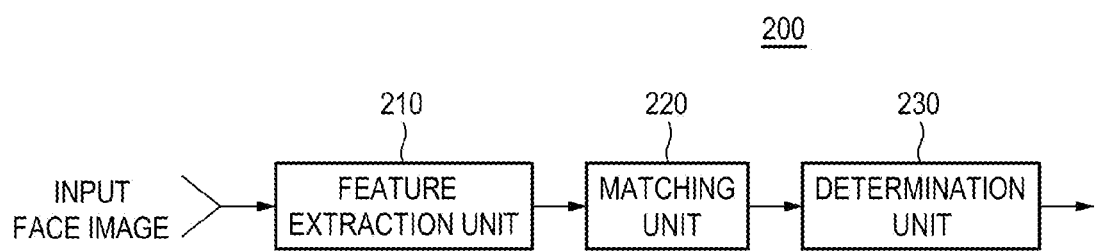
FIG. 3 is a block diagram illustrating a configuration of a face recognition device according to an embodiment of the present disclosure.

FIG. 3 is a block diagram illustrating a configuration of a face detection device according to an embodiment of the present disclosure.

Referring to FIG. 3, the face recognition device 200 may include a feature extraction unit 210, a matching unit 220, and a determination unit 230.

The feature extraction unit 210 may extract feature information on a face from a face image.

The matching unit 220 performs a function of comparing feature information obtained by the feature extraction unit 210 with feature information for the respective face images in the database (not shown), and searching an image with a high similarity.

Specifically, when the matching unit 220 performs a face matching, there may be a method of comparing whole faces, and a method of comparing individual elements of faces, i.e., elements such as eyes, a nose, a mouth, and the like.

In the latter case, the matching unit 220 may compare elements such as eyes, a nose, a mouth, and the like that are extracted as above with elements such as eyes, a nose, a mouth, and the like included in a plurality of regions of faces of a plurality of face images in the database (not shown) to determine an image of a person having a high similarity. Here, a similarity for a whole face may be also calculated using a weighted sum, in which a weight is applied to each element of a face, and the like. In this case, the weight of each element may be determined based on the importance according to human perception.

According to another embodiment of the present disclosure, each element is extracted in advance for each of a plurality of images of people recorded in a database (not shown) and may be recorded in a face element database (not shown). In this case, a matching operation performed by the matching unit 220 can be speeded up.

Figure 4:
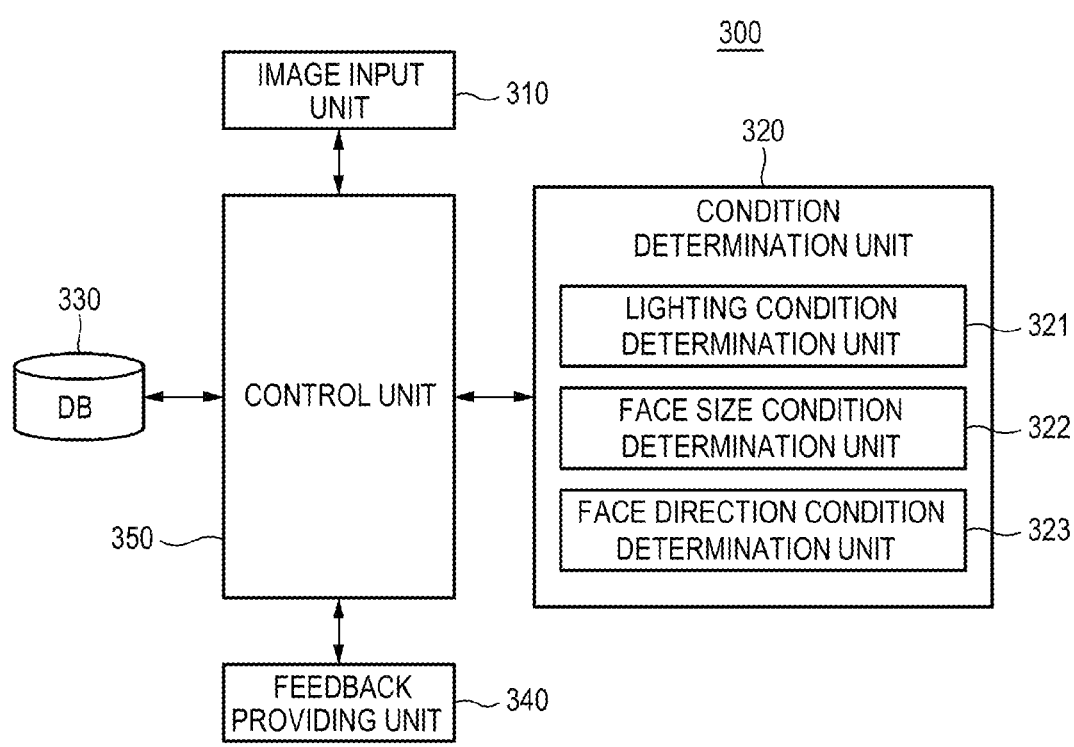
FIG. 4 is a block diagram illustrating a configuration of a device for providing a notification on a face recognition environment according to an embodiment of the present disclosure.

FIG. 4 is a block diagram illustrating a configuration of the face recognition environment notification device 300 according to an embodiment of the present disclosure.

Referring to FIG. 4, the face recognition environment notification device 300 includes an image input unit 310, a condition determination unit 320, a database 330, a feedback providing unit 340, and a control unit 350. The condition determination unit 320 may include a lighting condition determination unit 321, a face size condition determination unit 322, and a face direction condition determination unit 323.

The face recognition environment notification device 300 may perform functions of receiving, from the face detection device 100, an image, in which a region of a face is detected to determine whether the received image satisfies a predetermined effective condition for photographing, and providing a user with a predetermined feedback for photographing guidance that corresponds to whether the predetermined effective condition for photographing is satisfied.

For the above, the image input unit 310 interworks with the face detection device 100 and performs a function of receiving an input image, in which a region of a face is detected by applying the FD technique at the face detection device 100. Further, it may also perform a function of receiving an input of an image including direction information for the face region by applying the FD and HT techniques at the face detection device 100.

The condition determination unit 320 performs a function of determining whether the image input through the image input unit 310 satisfies the predetermined effective condition photographing. The predetermined effective condition for photographing may comprise at least one of a lighting condition, a face size condition and face direction condition. It is determined whether each of the conditions is satisfied at a lighting condition determination unit 321 for the lighting condition, at a face size condition determination unit 322 for the face size condition, and at a face direction condition determination unit 323 for the face direction condition.

Figure 5:
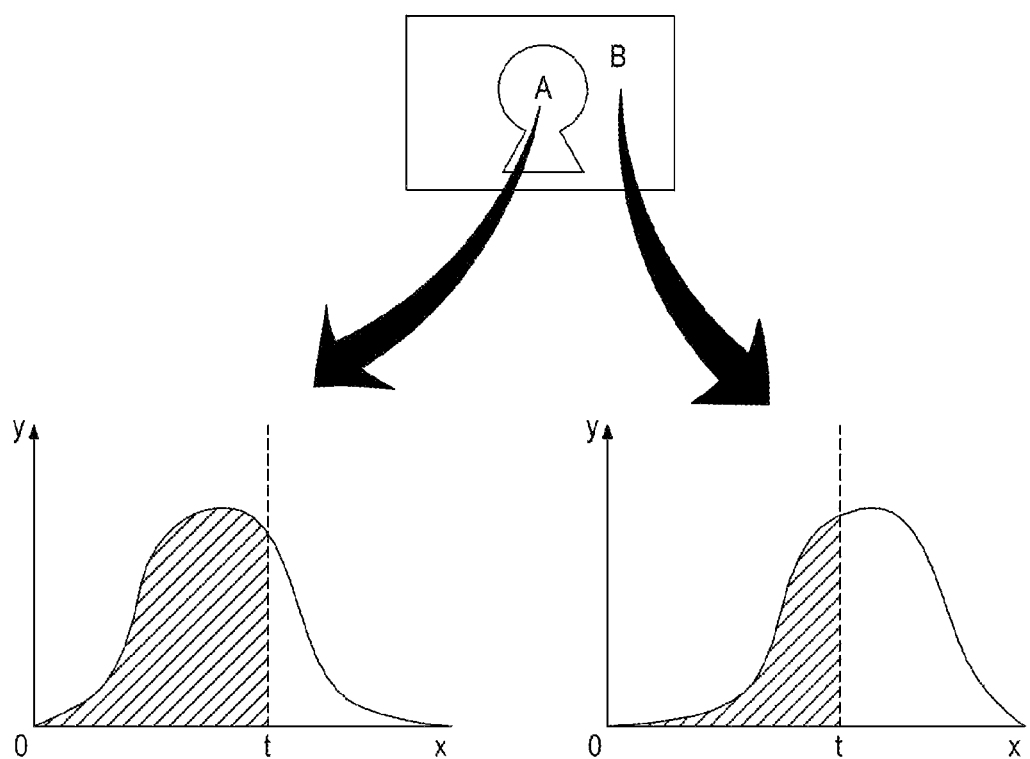
FIG. 5 is a diagram for illustrating a method of determining whether an input image satisfies a lighting condition according to an embodiment of the present disclosure.

FIG. 5 is a diagram for illustrating a method of determining whether an input image satisfies a lighting condition according to an embodiment of the present disclosure.

Referring to FIG. 5, first, the lighting condition determination unit 321 receives, from the face detection device 100, an image, where a region of a face is detected, separates the region of the face (A) and a region located outside the region of the face (B) from the image, and calculates a histogram of each of the separated regions.

The "histogram" refers to a distribution of pixel levels of an image, where each pixel in a digital image signal is classified and organized according to a level indicating brightness of each pixel. If an image is generally dark, the histogram is mainly distributed on dark values (values close to 0). On the other hand, if an image is generally bright, the histogram is mainly distributed on bright values (values close to 255). The histogram is suitable for indicating overall characteristics of an image, rather than specific information for elements that constitute an object in the image. Also, the histogram is advantageous in that it is relatively not affected by geometrical modifications such as rotations of an object, movements of an object, and the like and it is implemented through a simple algorithm.

Regarding the histograms shown in FIG. 5, the x-axis of the graphs represents brightness and the y-axis of the graphs means the number of pixels, and a given threshold value (t) may be set among values on the x-axis. The lighting condition determination unit 321 uses each of the histogram for the region of the face and the histogram for the region located outside the region of the face to calculate each of reference ratios. The reference ratio refers to a ratio that is the number of pixels as indicated in a hatched portion having brightness divided by the number of total pixels as indicated in a color portion. The brightness is represented by a value being lower than or equal to a predetermined threshold value.

The reference ratio for the region of the face is defined as a first reference ratio and the reference ratio for the region located outside the region of the face is defined as a second reference ratio. If the first reference ratio is lower than or equal to a predetermined threshold ratio, it is determined that a lighting condition is always satisfied. If the first reference ratio is higher than the predetermined threshold ratio and the second reference ratio is lower than the threshold ratio, it is determined as a backlit. Also, if both the first reference ratio and the second reference ratio are higher than the threshold ratio, it is determined that the amount of light is not sufficient.

In addition, the face region in the input image from the image input unit 310 is divided into a first region and a second region such as left and right regions or upper and lower regions, and histogram distributions of the respective regions are compared with each other. If a difference between the histogram distributions exceeds a threshold value, it is determined that a shadow was cast when the image was captured, since an illumination direction was not suitable.

The face size condition determination unit 322 performs a function of determining whether the size of the face region in the image input through the image input unit 310 is greater than or equal to a threshold size, and determining that an effective condition for photographing is not satisfied if the size of the face region does not reach the threshold size. The size of a region of a face on an image may be calculated using a known face detection algorithm at the face detection device 100. For example, it is determined that the effective condition for photographing is satisfied if there are at least 100 pixels or more for a face portion in the facial region. Further, the face size condition determination unit 322 may also perform a function of determining that an effective condition for photographing is not satisfied if the size of the facial region in an image input through the image input unit 310 is too big and a part of the face is cut out.

The face direction condition determination unit 323 performs a function of determining that an effective condition for photographing is not satisfied if the face located in the face region is rotated by a predetermined angle. For example, if a face is rotated beyond 15 degree from a front side to the left, right, upper or lower side, it may be determined that an effective condition for photographing is not satisfied. Here, it will be apparent that the 15 degree is merely an exemplary value and various modification examples are possible. The face direction condition determination unit 323 may also determine a face direction by performing the HT itself, or receive information on a result of the FD or the HT that is performed at the face detection device 100 and determine the face direction based thereon.

The database 330 may store information on an image input through the image input unit 310 and store a threshold, a threshold ratio, a threshold value, a threshold size, and the like for determining whether face recognition of the input image is possible at the condition determination unit 320. In addition, as described below, it can store an image, for which face recognition is failed, but determined to have a suitable face recognition environment.

The feedback providing unit 340 provides a user with a feedback for photographing guidance with regard to a face recognition environment based on the information that is determined at the condition determination unit 320.

More specifically, if the input image is determined as a backlit, the lighting condition determination unit 321 may provide a feedback for photographing guidance that provides an instruction for rotating a face direction or an instruction for taking a photograph at a place with a suitable illumination direction, since an illumination direction is not suitable while the amount of light is enough Alternatively, it may simply provide specific information for an environment that hinders the face recognition. In another example, if the amount of light necessary for the face recognition is insufficient, it may provide a feedback for photographing guidance that gives an instruction for moving to a brighter place, since there is insufficient amount of light. In a further example, if it is determined that a shadow is cast since a difference between respective histogram values for a first region and a second region, into which the face region is divided, is greater than or equal to a predetermined threshold value, a feedback for photographing guidance indicating that an illumination direction is not suitable may be provided.

In addition, the face size condition determination unit 322 may provide a feedback for photographing guidance that gives an instruction for coming closer to the image sensor, if the face region of the input image is determined to be too small. On the other hand, if the face region of the input image is determined to be too big, it may provide a feedback for photographing guidance that gives an instruction for moving farther from the imaging device.

Further, the face direction condition determination unit 323 may provide a photographing guide feedback that gives an instruction for rotating the face if a direction of the face region of the input image is beyond a predetermined angle from a facing direction of the front side of the image sensor.

As such, the feedback providing unit 340 may provide a signal in at least one of a text display output method, a color pattern display output method, and an audio output or vibration method, so as to provide a feedback for photographing guidance for implementing a desirable face recognition environment.

Meanwhile, each of the face recognition device 200 and the face recognition environment notification device 300 separately receives an input image from the face detection device 100, and perform the function of the device in parallel. Thus, as an operating result, the face recognition system can derive four results as follows. First, the face recognition device 200 succeeds in face recognition and the face recognition environment notification device 300 determines that an effective condition for photographing is satisfied. Second, the face recognition device 200 succeeds in face recognition and the face recognition environment notification device 300 determines that an effective condition for photographing is not satisfied. Third, the face recognition device 200 fails in face recognition and the face recognition environment notification device 300 determines that an effective condition for photographing is satisfied. Fourth, the face recognition device 200 fails in face recognition and the face recognition environment notification device 300 determines that an effective condition for photographing is not satisfied.

From among the above cases, the first and fourth cases may be regarded as obtaining a proper result, since the operation result for the face recognition device 200 is the same as that of the face recognition environment notification device 300. For the second case, since the face recognition environment notification device 300 determined that the effective condition for photographing is not satisfied while the face recognition is successful, the performance of a face recognition engine may be highly superior or it may be due to luck. For the third case, since the face recognition environment notification device 300 determined that the effective condition for photographing is satisfied while the face recognition has failed, an additional feedback for guidance may be provided through the feedback providing unit 340 to give an instruction for registering the input image in the database 330 as a face recognition comparison image. (Understandably, the image may be registered automatically without such feedback to support that a face recognition rate afterward is higher.)

The control unit 350 performs a function of controlling a flow of data among the image input unit 310, the condition determination unit 320, the database 330, and the feedback providing unit 340. That is, the control unit 350 controls a data flow between the respective elements in the face recognition environment notification device 300, and thereby controls each of the image input unit 310, condition determination unit 320, database 330 and feedback providing unit 340 to perform their functions.

The embodiments according to the present disclosure described above can be implemented in the form of program commands that can be executed through various computer components and recorded in a computer-readable recording medium. The computer-readable recording medium may include a program command, a data file, a data structure, and the like solely or in a combined manner. The program command recorded in the computer-readable recording medium may be a program command specially designed and configured for the present disclosure or a program command known to be used in computer software. The computer-readable recording medium includes, for example, a magnetic medium, such as a hard disk, a floppy disk, and a magnetic tape, an optical recording medium, such as a CD-ROM and a DVD, a magneto-optical medium, such as a floptical disk, and a hardware device specially configured to store and execute program commands, such as a ROM, a RAM, a flash memory, and the like. The program command includes, for example, a high-level language code that can be executed by a computer using an interpreter or the like, as well as a machine code generated by a compiler. The hardware device may be configured to operate as one or more software modules in order to perform the process according to the present disclosure, and vice versa.

In the above, even though the present disclosure has been described in connection with specific matters, such as the specific components, the various embodiments, and the drawings, they are provided only for assisting in a more overall understanding of the present disclosure, and the present disclosure is not limited to the embodiments. It will be apparent that those skilled in the art can make various modifications and changes thereto from these descriptions.

Therefore, the spirit of the present disclosure should not be limited to the aforementioned embodiments, and the appended claims and what are modified equally or equivalently thereto will be considered to fall within the scope of the present disclosure.

The invention claimed is:

1. A method comprising:
   comparing feature information for a face included in an input image with feature information for a plurality of reference images stored in a predetermined database to determine whether the input image satisfies each of a plurality of predetermined effective conditions for photographing, the plurality of predetermined effective conditions for photographing including a lighting condition, wherein the lighting condition is satisfied upon a determination that a first reference ratio is lower than or equal to a predetermined threshold ratio;
   determining whether a second reference ratio is lower than or equal to a predetermined threshold ratio upon a determination that the lighting condition is not satisfied; and
   providing a user with a predetermined feedback for photographing guidance that corresponds to whether the predetermined effective condition for photographing is satisfied, wherein the feedback for photographing guidance includes information that an amount of light is sufficient upon a determination that the second reference ratio is lower than or equal to the predetermined threshold ratio.

2. The method of claim 1, wherein the input image is newly registered as a reference person image in a database upon a determination that the effective condition for photographing is satisfied and a face recognition is failed.

3. The method of claim 1, wherein the predetermined effective condition for photographing further includes at least one of a face size condition and a face direction condition.

4. The method of claim 3, wherein the face size condition is satisfied if a size of the region of the face in the input image is greater than or equal to a predetermined threshold size.

5. The method of claim 4, wherein the size of the region of the face in the input image is determined by using a Face Detection (FD) technique in a face detection device.

6. The method of claim 3, wherein the face direction condition is satisfied if a facing direction of the face in the input image is within a predetermined angle from a facing direction of a front side of an image sensor.

7. The method of claim 6, wherein the facing direction of the face in the input image is determined by using a Head Tracking (HT) technique.

8. The method of claim 1, wherein the first reference ratio is calculated using a histogram for a region of the face in the input image and the second reference ratio is calculated using a histogram for a region located outside the region of the face in the input image.

9. The method of claim 1, wherein the first reference ratio is calculated using a ratio that is a number of pixels having a brightness value divided by a number of total pixels, the brightness value being lower than or equal to a predetermined threshold value.

10. The method of claim 1, wherein the feedback for photographing guidance includes information that an amount of light is not sufficient upon a determination that the second reference ratio exceeds the threshold ratio.

11. A device comprising:
an image input unit to obtain an input image that is input in a preview state;
a memory to store instructions; and
a processor configured to execute the instructions stored in the memory and to
compare feature information for a face included in an input image with feature information for a plurality of reference images stored in a predetermined database to determine whether the input image satisfies each of a plurality of predetermined effective conditions for photographing, the plurality of predetermined effective conditions for photographing, and including a lighting condition unit to determine a lighting condition, wherein the lighting condition is satisfied upon a determination that a first reference ratio is lower than or equal to a predetermined threshold ratio and determining whether a second reference ratio is lower than or equal to a predetermined threshold ratio upon a determination that the lighting condition is not satisfied, and
provide a user with a predetermined feedback for photographing guidance that corresponds to whether the predetermined effective condition for photographing is satisfied, wherein the feedback for photographing guidance includes information that an amount of light is sufficient upon a determination that the second reference ratio is lower than or equal to the predetermined threshold ratio.

12. The method of claim 11, wherein the processor is further configured to execute instructions stored in the memory to at least determine one of a face size condition and a face direction condition.

13. The device of claim 12, wherein the size of the region of the face in the input image is determined by using a FD technique in the device.

14. The device of claim 13, wherein the processor is further configured to determine that the effective condition for photographing is satisfied if a facing direction of the face in the inputted image is within a predetermined angle from a facing direction of a front side of an image sensor.

15. The device of claim 12, wherein the facing direction of the face in the input image is determined by using a HT technique.

16. The device of claim 15, wherein the feedback for photographing guidance output from the feedback providing unit is provided based on at least one of text display output, color pattern display output, and audio output or vibration.

17. A non-transitory computer-readable recording medium having instructions thereon which, when executed by a processor, causes the processor to:
compare feature information for a face included in an input image with feature information for a plurality of reference images stored in a predetermined database to determine whether the input image satisfies each of a plurality of predetermined effective conditions for photographing, the plurality of predetermined effective conditions for photographing including a lighting condition, wherein the lighting condition is satisfied upon a determination that a first reference ratio is lower than or equal to a predetermined threshold ratio;
determine whether a second reference ratio is lower than or equal to a predetermined threshold ratio upon a determination that the lighting condition is not satisfied; and
provide a user with a predetermined feedback for photographing guidance that corresponds to whether the predetermined effective condition for photographing is satisfied, wherein the feedback for photographing guidance includes information that an amount of light is sufficient upon a determination that the second reference ratio is lower than or equal to the predetermined threshold ratio.

18. The non-transitory computer-readable recording medium of claim 17, wherein the first reference ratio is calculated using a histogram for a region of the face in the input image and the second reference ratio is calculated using a histogram for a region located outside the region of the face in the input image.

19. The non-transitory computer-readable recording medium of claim 18, wherein the first reference ratio is calculated using a ratio that is a number of pixels having a brightness value divided by a number of total pixels, the brightness value being lower than or equal to a predetermined threshold value.

20. The non-transitory computer-readable recording medium of claim 18, wherein the feedback for photographing guidance includes information that an amount of light is not sufficient upon a determination that the second reference ratio exceeds the threshold ratio.

* * * * *